S. N. Taylor,
Universal Joint.
Nº 41,651.    Patented Feb. 16, 1864.
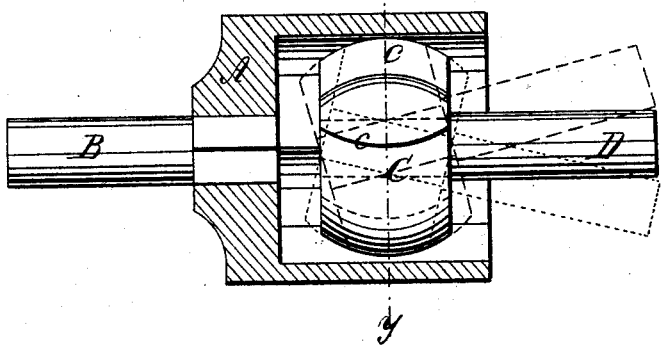
Fig. 1
Fig. 2
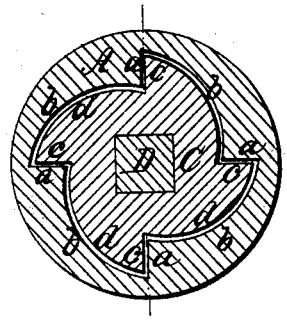
Witnesses;
J W Coombs
G W Reed
Inventor;
Simeon N. Taylor
per Munn & Co
Attorneys

UNITED STATES PATENT OFFICE.

SIMEON N. TAYLOR, OF BURNET, WISCONSIN.

IMPROVEMENT IN KNUCKLE-JOINTS FOR SHAFTING.

Specification forming part of Letters Patent No. 41,651, dated February 16, 1864.

*To all whom it may concern:*

Be it known that I, SIMEON N. TAYLOR, of Burnet, in the county of Dodge and State of Wisconsin, have invented a new and improved knuckle-joint for connecting the tumbling-rods of thrashing-machines and shafting of other machinery; and I do hereby declare that the following is a full, clear, and exact description of the same, reference being had to the accompanying drawings, making a part of this specification, in which—

Figure 1 is a longitudinal central section of the shell or case of my improved knuckle-joint, $x\ x$, Fig. 2, indicating the plane of section; Fig. 2, a transverse vertical section of the same, taken in the line $y\ y$, Fig. 1.

Similar letters of reference indicate corresponding parts in the two figures.

This invention relates to a new and improved coupling for connecting together the tumbling-rods of thrashing-machines and the shafting of other machinery which require to be placed in an oblique position relatively with each other.

The object of the invention is to obtain a coupling of the class specified, which will admit of the ready connection of the tumbling-rods or shafting, and one which will not be attended with the danger of catching the clothes of the attendants or operators and injuring the same.

To this end the invention consists in the employment or use of a socket, provided with internal longitudinal shoulders and attached to one end of one tumbling-rod, and in the employment or use of a head attached to the other tumbling-rod and provided with projections, the outer surfaces of which are rounded or curved, all being arranged as herein set forth.

To enable those skilled in the art to fully understand and construct my invention, I will proceed to describe it.

A represents a socket, which, externally, may be of cylindrical form, and is attached to one end of one of the tumbling-rods or shafts B. This socket A is provided internally with a series of longitudinal shoulders, $a$, which are formed by making eccentric-curved recesses or grooves $b$ in the socket, as shown clearly in Fig. 2. The shoulders $a$ extend the whole length of the interior of the socket A, as shown in Fig. 1.

C represents a head, which is attached to one end of the other tumbling rod or shaft D. This head C has a series of projections, $c$, on its periphery, said projections being formed by making eccentric curved recesses $d$ in the periphery of the head, and curving the same in a direction longitudinally with the head C, so as to give a curved exterior to the projections, as shown clearly in Fig. 1. The shoulders $a$ have a radial position relatively with the exterior surface or periphery of the socket A, and the face sides of the projections $c$ of the head C have a radial position relatively with the shaft D, as shown clearly in Fig. 2. The head C is of such diameter at its largest central part that it may fit into the socket A, and as the other parts of the head are curved inward at both sides of the center it will be seen that the two shafts B D may be placed in line or in an oblique position relatively with each other, (see Fig. 1,) and rotated in such position, the socket and head forming the connection between the two shafts, the faces of the shoulders $a$ and projections $c$ being in contact. This coupling admits of the tumbling rods or shafts being connected with the greatest facility, all that is required being simply the fitting of the head C into the socket A; and it will be seen that there are no parts liable to catch the clothing of the attendants or operators, as the head C is completely inclosed by the socket A, and the latter has a smooth exterior.

Having thus described my invention, what I claim as new, and desire to secure by Letters Patent, is—

The socket A, provided with the internal longitudinal shoulders, $a$, in combination with the head C, having the curved projections $c$ on its periphery, all constructed and arranged substantially as and for the purpose herein set forth.

SIMEON N. TAYLOR.

Witnesses:
G. W. VAN BRUNT,
WM. E. CROFT.